United States Patent Office 3,497,435
Patented Feb. 24, 1970

3,497,435
PHOTOISOMERIZATION OF α,α'-DIMETHYL-MUCONIC ACID
William W. Wimer, East Marlborough Township, Chester County, and George Suld, Springfield, Pa., assignors to Sun Oil Company, Philadelphia, Pa., a corporation of New Jersey
No Drawing. Filed May 27, 1968, Ser. No. 732,080
Int. Cl. B01t 1/10
U.S. Cl. 204—158                         17 Claims

ABSTRACT OF THE DISCLOSURE

The trans,trans-isomer of dimethylmuconic acid (DMMA) can be prepared conveniently and in high yields by the photoisomerization of cis,cis-DMMA by using a photosensitizer selected from aromatic hydrocarbons or ketones having triplet state excitation energy of above 55 kcal./mole and an oxygenated organic solvent containing water. For example, 20 grams of cis,cis-DMMA was slurried in an ethanol/water solvent (10:1) and heated to reflux in the presence of incandescent flood lamps and 21.5 grams of benzophenone for 17 hours to give a yield of 71.0 of trans,trans-DMMA. A similar run with the photosensitizer omitted yield no trans,trans-DMMA.

---

The present invention relates to a novel process for the isomerization of α,α'-dimethylmuconic acid (DMMA). More particularly it is a photoisomerization process for converting α,α'-dimethyl-cis,cis-muconic acid to the -trans,trans-form thereof. There are three geometric isomers of α,α'-dimethylmuconic acid.

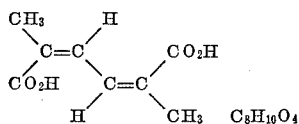

α,α'-dimethyl-cis,cis-muconic acid

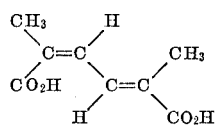

α,α'-dimethyl-cis,trans-mucnoic acid

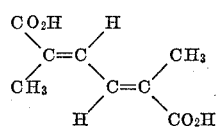

α,α'-dimethyl-trans,trans-muconic acid

The three isomeric dimethylmuconic acids are white crystalline powders with the following physical properties:

TABLE I

|  | Cis,cis | Cis,trans | Trans,trans |
|---|---|---|---|
| Molecular wt. | 170.2 | 170.2 | 170.2 |
| Melting pt. °C | [1] 223–224 | [1] 179–180 | [1] 332–333 |
| Ionization constants: |  |  |  |
| At 25° C., p$K_1$ | 3.37 | 3.65 | [3] |
| At 25° C., p$K_2$ | 4.73 | 5.20 | [3] |
| Solubility, g./100 g. solution 25.0° |  |  |  |
| C., water | 0.026 | 0.244 | 0.0036 |
| Water | [2] 0.24 | [2] 1.97 | [2] 0.032 |
| Ethyl alcohol | 3.30 | 22.7 | 0.39 |
| Ethyl acetate | 0.185 | 2.17 | 0.028 |
| Acetone | 0.994 | 7.60 | 0.112 |
| Benzene | 0.006 | 0.023 | 0.008 |
| Spectra, U.V., visible max., (CH$_3$OH) | 273 | 278 | 282 |

[1] M.P. varies with the rate of heating.
[2] At 80° C.
[3] Not determined.

The -cis,cis-DMMA has been produced by two principal methods. The older method is that shown by Elvidge et al., J. Chem. Soc., 1952, pp. 1026–33 which is the peracetic acid oxidation of p-xylenol. An alternative method for producing the α,α'-dimethyl-cis,cis muconic acid is disclosed in copending commonly assigned application Ser. No. 509,621, Raymond et al., filed Nov. 24, 1965, now Patent No. 3,383,289, which discloses a microbiological oxidation of alkylbenzenes. The cis,cis-DMMA is produced by a particular strain or microorganism of genus Nocardia, more particularly Nocardia corallina, a culture of which has been deposited with the American Type Culture Collection, Washington, D.C., under the number ATCC 19,070.

In order to obtain the cis,trans- and the trans-trans-isomers it is necessary to isomerize the cis,cis-DMMA. Elvidge et al. inverted the cis,cis-DMMA to trans,trans-DMMA with boiling alkali and to cis,trans-DMMA by conversion to an unsaturated gamma lactonic acid and subsequent treatment with methanolic sodium methoxide.

DMMA can be used for the preparation of polymers such as polyesters and polyamides or crosslinked with itself to produce a resin. The isomers, particularly the trans,trans-DMMA, have been found to be useful stabilizers for α,olefin polymers such as polypropylene for petroleum waxes, mineral oils and natural and synthetic rubber.

Briefly stated, the invention is a process of converting α,α'-dimethyl-cis,cis-muconic acid to α,α'-dimethyl-trans,trans-muconic acid comprising contacting α,α'-dimethyl-cis,cis-muconic acid with an inert oxygenated organic solvent and water at a temperature in the range of 30 to 200° C., subjecting the resulting mixture to light in the presence of a photosensitizer selected from the group consisting of aromatic ketones, aromatic hydrocarbons and mixtures thereof having triplet state excitation energy of above 55 kcal./mole and recovering α,α'dimethyl-trans,trans-muconic acid.

One embodiment of the present invention is a one-stage process for the conversion of α,α'-dimethyl-cis,cis-muconic acid to α,α'-dimethyl-trans,trans-muconic acid comprising contacting α,α'-dimethyl-cis,cis-muconic acid with an inert oxygenated organic solvent and water in the presence of a photosensitizer selected from the group consisting of aromatic ketones, hydrocarbons and mixtures thereof having triplet state excitation energy of about 55 kcal./mole and light at a temperature in the range of 30 to 200° C. and recovering α,α'-dimethyl-trans,trans-muconic acid.

In another embodiment the cis,cis-DMMA is converted to cis,trans-DMMA in one step and then in another step by the addition of the photosensitizer the cis,trans-DMMA is converted to trans,trans-DMMA. Briefly stated this process comprises the steps of (1) contacting α,α'-dimethyl-cis,cis-muconic acid with an inert oxygenated organic solvent and water at a temperature of 30 to 200° C. (2) adding a photosensitizer selected from the group consisting of aromatic ketones, aromatic hydrocarbons and mixtures thereof having triplet state excitation energy above 55 kcal./mole to the mixture of step 1 and subjecting the mixture to light at a temperature in the range of 30 to 200° C. and recovering α,α'-dimethyl-trans,trans-muconic acid.

The presence of both a photosensitizer and water have been found to be necessary to obtain high conversions in reasonable periods of time. The water is preferably present as part of the solvent, and is present generally in the volume ratio of inert oxygenated organic solvent to water in the range of 100:1 to 1:1 though the preferred ratio is in the range of 20:1 to 4:1.

The omission of water from the system will result in substantially lower yields and longer conversion times. The entire function of water is not known but it is known to be important for rapid conversions of cis,cis-DMMA to cis,trans-DMMA. The inert oxygenated organic solvent is preferably selected from the group consisting of primary alcohols, tertiary alcohols, glycols, glycol ethers, lower ketones and mixtures thereof, for example, methanol, ethanol, n-propanol, ethylene glycol, propylene glycol, diethylene glycol, 2-methoxy-ethanol, 2-ethoxy-ethanol and ketones having 3–7 carbon atoms such as acetone, methylethylketone, diethyl ketone and the like. The preferred inert oxygenated organic solvent is an alcohol selected from the group consisting of methanol, ethanol, and n-propanol.

One of the advantages of the described solvents is the relationship of the solubilities of the isomers in each. The trans,trans-DMMA has been found to be the least soluble of the isomers in any particular solvent of the type described, although the actual solubilities will vary. The net result is that the trans,trans-DMMA can be precipitated in high purity from the reaction medium while any residual cis-cis- and cis,trans-DMMA remains in solution.

The photosensitizer is an aromatic ketone or an aromatic hydrocarbon having a triplet state excitation energy of about 55 kcal./mole. The more advantageous photosensitizers which are preferred will be those having triplet state excitation energies in the range of 55 to 80 kcal./mole.

The efficiency of photosensitizers for the conversion of cis,cis-DMMA to trans,trans-DMMA varies depending on their molecular structure. As seen from Tables II, III and V, benzophenone is the most efficient sensitizer, however, acetophenone, fluorene and phenanthrene also give good results. Naphthalene and biphenyl are correspondingly less active. Other compounds useful as the sensitizers for the above photoisomerization are xanthen-9-one, thioxanthenone, and triphenylene. The photosensitizer is generally employed in approximately equal molar quantities with the charge DMMA present, however, suitable results can be obtained when the molar ratio of photosensitizer to DMMA to be converted is in the range of 2:1 to 0.05:1 (Table II).

The light employed can be sunlight, that derived from ordinary incandescent lamps, flood lamps using tungsten or mercury vapor filaments, fluorescent lamps, ultraviolet lights and the like. Suitable light has wave length in the range of about 150–800 m$\mu$. If desired, optical filters transmitting light with the wavelength absorbed only by the photosensitizer but not DMMA, may be used. It has been convenient to use flood lamps since it was possible to obtain the necessary heat for the reaction from the light source. Various combinations of the light sources can be employed together, for example, when ultraviolet light is employed in addition to flood lamps shorter reaction times are achieved. It should be understood that the light can be a part of the spectrum such as ultraviolet, i.e., 200–400 m$\mu$ or can be a broader spectrum of all the the wave lengths in the range of 150–800 m$\mu$.

In a typical run, 20 ml. of water is added to 200 ml. of ethanol. Enough cis,cis-DMMA is added to produce a slurry at room temperature (25° C.). An equal molar amount of benzophenone based on cis,cis-isomer is added to the slurry and the reaction mixture heated to reflux by three General Electric 150 watt flood lamps. The temperature for the process of the invention can be in the range of 30 to 200° C. but it is preferably in the range of 60 to 120° C. Depending on the amount of cis,cis-DMMA charged originally, either a complete solution is obtained at the reflux temperature or a gradual dissolution of the starting material will occur in the course of the reaction. If a complete solution is not obtained at the reflux temperature, refluxing is continued for about 34 hours. If the cis,cis-DMMA goes into solution at reflux temperature, refluxing is continued until appreciable quantities of precipitate appear in the refluxing solvent. The precipitate is trans,trans-DMMA, which has a very low solubility in ethanol (0.39 g./100 g.). The cis,cis-DMMA is also poorly soluble in ethanol, (3.30 g./100 g.) but this is about 10 times more soluble than the trans,trans-isomer, thus making separation and recovery of the trans,trans-isomer very easy. The trans,trans-DMMA is recovered by filtering and can be washed with water and ethanol to remove any cis,cis-DMMA, cis,trans-DMMA or benzophenone.

The cis,trans-isomer is an intermediate product of the isomerization. For example, if cis,cis-DMMA is heated for about 10 hours in the ethanol-water solvent in the absence of benzophenone high yields of cis,trans-DMMA are achieved. The cis,trans-DMMA can be recovered and purified and subsequently converted to trans,trans-isomer or it can be converted directly to the trans,trans-isomer by addition of benzophenone and irradiation of the solution containing the cis,trans-DMMA (Table II). The cis,trans-isomer is also useful for the preparation of polymers and the like.

If the light source is located outside of the reaction zone, the reactor must be sufficiently transparent to allow adequate light to pass into the reaction solution to achieve the conversion. Suitable materials are glass, for example, Pyrex and quartz, crosslinked polymers, and the like. The reaction vessel may be made of any conventional material if the light source is located inside the reactor, for example, stainless steel, refractory ceramics and the like.

The following examples are submitted to illustrate the various permutations and embodiments of the invention.

EXAMPLES 1–12

The equipment consisted of three 150 watt flood lamps (General Electric flood 150 watt, 120 volt) placed at three equidistant points around a 500 ml. Erlenmeyer Pyrex flask about an inch from the outside surface. The flask was equipped with a reflux condenser and stirred by means of a magnetic stirring bar. The flood lamps heated the reaction mixture and maintained it at reflux temperature. Table II shows the results of 12 runs. Examples 8 and 9 show the effect of omitting benzophenone. Example 10 shows the effect of omitting water. The result in both instances is the absence of trans,trans-DDMA in the reaction mixture. Example 12 shows the effect of the addition of an ultraviolet source (Hanovia high pressure quartz mercury lamp, type 16200) to the three flood lamps. Also a 500 ml. quartz round bottom flask was substituted. The net effect was to substantially reduce the reaction time. Note that at two hours 38% yield was achieved in Example 12 compared to 10% yield after two hours in Example 4 where no ultraviolet light was employed.

Product identification and purity in the examples were determined mainly by gas-liquid chromatography (g.l.c.) and by melting point. The g.l.c. method consisted of preparing the silyl esters of DMMA using bis(trimethylsilyl) acetamide (BSA) as the silylation agent. This reagent and method are discussed in a paper by J. F. Klebe, H. Finkbeiner and D. M. White, J. Am. Chem. Soc. 88, 3390, (1966).

Other analytical methods employed, were paper chromatography and nuclear magnetic resonance (n.m.r.).

TABLE II.—BENZOPHENONE SENSITIZED PHOTOISOMERIZATION OF m,m'-DIMETHYL cis,cis MUCONIC ACID TO m,m' DIMETHYL trans,trans MUCONIC ACID

| | Charged | | | | | Recovery | | |
|---|---|---|---|---|---|---|---|---|
| | Cis,cis DMMA, grams | Ethanol, ml. | Water, ml. | Benzo-phenone, grams | Irradiating | Heating time, hours | Trans, trans DMMA, grams | Yield, percent |
| Run No.: | | | | | | | | |
| 1 | 20.0 | 100 | 10 | 21.5 | | 42 | 17.7 | 88.0 |
| 2 | 20.0 | 100 | 10 | 21.5 | 1st crop | 26 | 16.3 | 81.5 |
| | | | | | 2nd crop | 16 | 0.6 | 3.0 |
| | | | | | Total | 42 | 16.9 | 84.5 |
| 3 | 20.0 | 150 | 20 | 21.5 | 1st crop | 25 | 14.2 | 71.0 |
| | | | | | 2nd crop | 16 | 2.4 | 12.0 |
| | | | | | Total | 41 | 16.6 | 83.0 |
| 4 | 20.0 | 200 | 20 | 21.5 | | 2 | 2.0 | 10.0 |
| 5 | 20.0 | 200 | 20 | 21.5 | | 5 | 5.3 | 26.4 |
| 6 | 20.0 | 200 | 20 | 21.5 | 1st crop | 10 | 8.4 | 42.0 |
| | | | | | 2nd crop | 7 | 4.9 | 24.5 |
| | | | | | 3rd crop | 25 | 3.0 | 15.0 |
| | | | | | Total | 42 | 16.3 | 81.5 |
| 7 | 20.0 | 200 | 20 | 21.5 | | 34 | 16.0 | 80.0 |
| 8 | 20.0 | 200 | 20 | 0 | | 17 | 0 | 0 |
| | | | | [2] 21.5 | | 17 | 12.9 | 64.6 |
| | | | | | Total | 34 | 12.9 | 64.6 |
| 9 | 20.0 | 200 | 20 | 0 | | 17 | 0 | 0 |
| | | | | [2] 21.5 | | 17 | 14.1 | 71.0 |
| | | | | | Total | 34 | 14.1 | 71.0 |
| 10 | 20.0 | 200 | 0 | 21.5 | No water | 8 | 0 | 0 |
| 11 | 20.0 | 200 | 20 | 5.3 | | 17 | 10.9 | 54.5 |
| 12 [1] | 20.0 | 200 | 20 | 21.5 | 1st crop | 2 | 7.6 | 38.0 |
| | | | | | 2nd crop | 2 | 5.3 | 26.5 |
| | | | | | 3rd crop | 3 | 2.4 | 12.0 |
| | | | | | Total | 7 | 15.3 | 76.5 |
| 13 | 20.0 | 200 | 20 | 6.0 | 1st crop | 7 | 5.3 | 26.5 |
| | | | | | 2nd crop | 7 | 4.4 | 22.0 |
| | | | | | 3rd crop | 9 | 3.6 | 18.0 |
| | | | | | 4th crop | 7 | 1.3 | 6.5 |
| | | | | | 5th crop | 7 | 0.8 | 4.0 |
| | | | | | Total | 37 | 15.4 | 77.0 |

[1] (U.V. Lamp in addition to regular "flood lamps" in Run 12).
[2] After 17 hours, benzophenone was added.

EXAMPLE 13

This example was performed to show the recycle of the alcohol-water solvent containing benzophenone. After the completion of the run of Example 6 the liquid phase was removed by filtration. This filtrate was used in three additional runs with no addition of either water or benzophenone. The results are set out in Table III. The overall yield from the recycles was about 90% of trans,trans-DMMA.

TABLE III.—RECYCLE OF THE SOLVENT SOLUTION IN THE BENZOPHENONE SENSITIZED PHOTOISOMERIZATION OF α,α'-DIMETHYL cis,cis MUCONIC ACID TO α,α'-DIMETHYL trans,trans MUCONIC ACID

| | Charged | | | | Recovery | |
|---|---|---|---|---|---|---|
| | Ethanol,[2] ml. | Water,[1] ml. | Benzo-phenone,[1] grams | Irradiating | Heating time, hours | trans trans DMMA gram |
| Cis,cis-DMMA, grams: | | | | | | |
| 16.3 | 200 | 20 | 21.5 | 1st recycle | 7 | 6.7 |
| 6.0 | 200 | 20 | 21.5 | 2nd recycle | 6 | 5.6 |
| 6.0 | 200 | 20 | 21.5 | 3rd recycle | 23 | 12.0 |
| | | | | 2nd crop, 3rd recycle | 17 | 2.8 |
| 28.3 | | | | Total | 53 | 27.1 |

[1] Amount originally present.
[2] Small amounts of ethanol added after each recycle to bring to original volume.

EXAMPLE 14

This example shows the result of using fluorescent lamps. A bank of fluorescent tubes irradiating 9000 lumens/square meter was placed 12 inches from the surface of a 1 oz. soft glass flask at 30–32° C. A nearly saturated solution of cis,cis-DMMA (0.31 moles/liter) in ethanol was maintained under these conditions for 90 hours. Only trace amounts of trans,trans-DMMA were found. A similar solution was subjected to the same conditions but with benzophenone added (0.12 moles/liter). This run gave a yield of about 40% trans,trans-DMMA.

EXAMPLE 15

This example shows the production of cis,trans-DMMA and the subsequent treatment of aliquots thereof. A slurry of 69 grams of cis,cis-DMMA was heated under reflux in ethanol and water (276 g. each) for 15 hours. The conversion to cis,trans-DMMA is essentially complete. If only ethanol is used the conversion is very slow. The resulting solution of cis,trans-DMMA was divided into 4 aliquots and treated as indicated in Table IV. Aliquots A–C were subjected to fluorescent lights by the procedure described in Example 14 for about 200 hours. The results are shown in Table IV. The run with benzophenone gave the best yield of trans,trans-DMMA.

photosensitizer selected from the group consisting of aromatic ketones, aromatic hydrocarbons and mixtures thereof having triplet state excitation energy of above 55 kcal./mole and recovering $\alpha,\alpha'$-dimethyl-trans,trans-muconic acid.

2. The process according to claim 1 wherein the volume ratio of inert oxygenated organic solvent to water is in the range of 100:1 to 1:1.

3. The process according to claim 2 wherein the ratio is in the range of 20:1 to 4:1.

4. The process according to claim 2 wherein the molar ratio of photosensitizer to dimethylmuconic acid charge is in the range of 2:1 to 0.05:1.

5. The process according to claim 4 wherein the inert oxygenated organic solvent is selected from the group consisting of primary alcohols, tertiary alcohols, glycols, glycol ethers, lower ketones and mixtures thereof.

6. The process according to claim 5 wherein the inert oxygenated organic solvent is selected from the group consisting of methanol, ethanol and n-propanol.

7. The process according to claim 6 wherein the photosensitizer is benzophenone.

8. The process according to claim 7 wherein the volume ratio of alcohol to water is in the range of 20:1 to 4:1.

TABLE IV.—PHOTOISOMERIZATION OF $\alpha,\alpha'$-DIMETHYL cis,trans MUCONIC ACID TO $\alpha,\alpha'$-DIMETHYL trans,trans MUCONIC ACID

| Aliquot | Ethanol water solution containing c,t-DMMA, grams | Theoretical amount of c,t-DMMA in aliquot, assuming 100% conversion from c,c-DMMA, grams | Additive, grams | Irradiating | Heating time, hours | Trans,trans-DMMA product, grams | Percent yield of t,t-DMMA |
|---|---|---|---|---|---|---|---|
| A | 68.5 | 7.60 | 0.9 benzophenone | 1st crop | 97 | 5.2 | 68.4 |
|   |      |      |                  | 2nd crop | 17 | 1.0 | 13.2 |
|   |      |      |                  | 3rd crop | 86 | 0.3 | 3.8 |
|   |      |      |                  | Total    | 200 | 6.5 | 85.4 |
| B | 218.7 | 24.30 | None | 1st crop | 97 | 6.8 | 28.0 |
|   |       |       |      | 2nd crop | 17 | 4.2 | 17.2 |
|   |       |       |      | 3rd crop | 86 | 5.2 | 21.4 |
|   |       |       |      | Total    | 200 | 16.2 | 66.6 |
| C | 248.2 | 27.55 | Trace of iodine | 1st crop | 97 | 5.9 | 21.3 |
|   |       |       |                 | 2nd crop | 17 | 3.4 | 12.3 |
|   |       |       |                 | 3rd crop | 86 | 6.2 | 22.4 |
|   |       |       |                 | Total    | 200 | 15.5 | 56.0 |
| D | Control | | Not subjected to light | | 200 | Only a trace of solids present [1] | |

[1] Not identified.

EXAMPLES 16–20

Using essentially the same procedure and equipment as in Examples 1–12, the photoisomerization of cis,cis-DMMA was carried out with several different photosensitizers. The results are shown in Table V.

9. The process according to claim 5 wherein the photosensitizer is selected from the group consisting of benzophenone, acetophenone, fluorene, phenanthrene, naphthalene, biphenyl, xanthen-9-one, thioxanthenone and triphenylene.

TABLE V.—PHOTOISOMERIZATION OF $\alpha,\alpha'$-DIMETHYL cis,cis MUCONIC ACID TO $\alpha,\alpha'$-DIMETHYL trans,trans MUCONIC ACID WITH VARIOUS PHOTOSENSITIZERS

| | Charged | | | | | Recovery | |
|---|---|---|---|---|---|---|---|
| Example | Cis,cis-DMMA, grams | Ethanol, ml. | Water, grams | Photosensitizer, grams | Irradiating and heating time, hours | Trans,trans-DMMA, grams | Yield, percent |
| 16 | 20.0 | 200 | 20 | 13.9 naphthalene | 64 | 2.9 | 14.6 |
| 17 | 20.0 | 200 | 20 | 12.7 biphenyl | 64 | 3.4 | 17.0 |
| 18 | 20.0 | 200 | 20 | 4.1 fluorene | 34 | 5.7 | 28.5 |
| 19 | 20.0 | 200 | 20 | 14.2 acetophenone | 34 | 8.2 | 41.0 |
| 20 | 20.0 | 200 | 20 | 4.2 phenanthrene | 34 | 4.6 | 23.0 |

The invention claimed is:

1. A process for the production of $\alpha,\alpha'$-dimethyl-trans,trans-muconic acid comprising contacting $\alpha,\alpha'$-dimethyl-cis,cis-muconic acid with an inert oxygenated solvent and water at a temperature in the range of 30 to 200° C., subjecting the resulting mixture to light in the presence of a 10. The process according to claim 9 wherein the photosensitizer is selected from the group consisting of benzophenone, acetophenone, fluorene, phenanthrene, naphthalene and biphenyl.

11. The process according to claim 10 wherein the photosensitizer is selected from the group consisting of benzophenone, acetophenone, fluorene and phenanthrene.

12. The process according to claim 5 wherein the temperature is in the range of 60–120° C.

13. The process according to claim 1 wherein the light has wave length in the range of 150–800 mμ.

14. The process according to claim 1 comprising the steps (1) contacting α,α'-dimethyl-cis,cis-muconic acid with an inert oxygenated organic solvent and water at a temperature in the range of 30 to 200° C. (2) adding a photosensitizer selected from the group consisting of aromatic ketones, aromatic hydrocarbons, and mixtures thereof having triplet state excitation energy of above 55 kcal./mole to the mixture of step 1 and subjecting the mixture to light at a temperature in the range of 30 to 200° C. and (3) recovering α,α'-dimethyl-trans,trans-muconic acid.

15. The process according to claim 14 wherein the inert oxygenated organic solvent is selected from the group consisting of methanol, ethanol and n-propanol, the volume ratio of the inert oxygenated organic solvent to water is in the range of 20:1 to 4:1, the photosensitizer is benzophenone, the molar ratio of benzophenone to dimethylmuconic acid charge is in the range of 2:1 to 0.05:1, and the temperature is in the range of 60–120° C.

16. A process for the production of α,α'-dimethyl-trans,-trans-muconic acid comprising contacting α,α'-dimethyl-cis,trans-muconic acid with an inert oxygenated solvent and water at a temperature in the range of 30 to 200° C., subjecting the resulting mixture to light in the presence of a photosensitizer selected from the group consisting of aromatic ketones, aromatic hydrocarbons, and mixtures thereof having triplet state excitation energy of above 55 kcal./mole and recovering α,α'-dimethyl-trans,trans-muconic acid.

17. The process according to claim 16 wherein the inert oxygenated organic solvent is selected from the group consisting of methanol, ethanol and n-propanol, the volume ratio of inert oxygenated solvent to water is in the range of 20:1 to 4:1, the photosensitizer is benzophenone, the molar ratio of benzophenone to dimethylmuconic acid charge is in the range of 2:1 to 0.05:1, and the temperature is in the range of 60–120° C.

References Cited
UNITED STATES PATENTS 2,979,445   4/1961   Lanigne et al. _____ 204—158

HOWARD S. WILLIAMS, Primary Examiner